Feb. 25, 1958   K. K. KNIGHT ET AL   2,824,616
AUTOMATIC SELF-STEERING VEHICLE
Filed Jan. 17, 1955   3 Sheets-Sheet 1
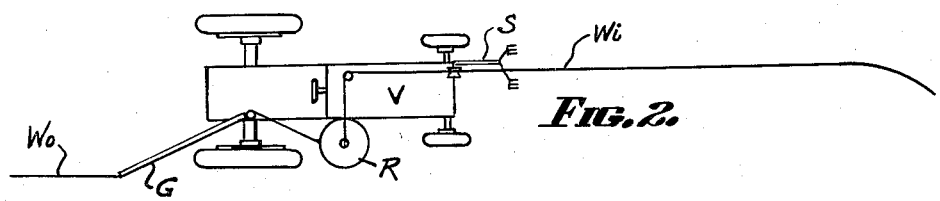
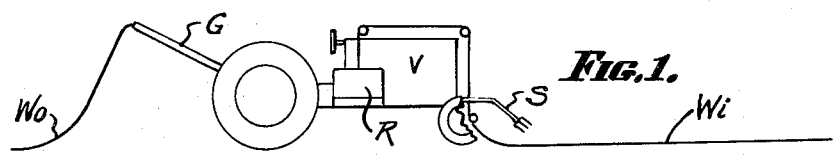
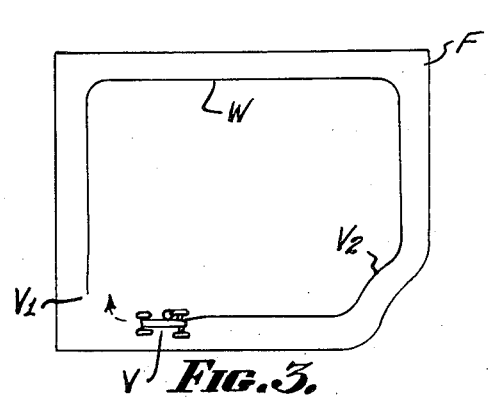
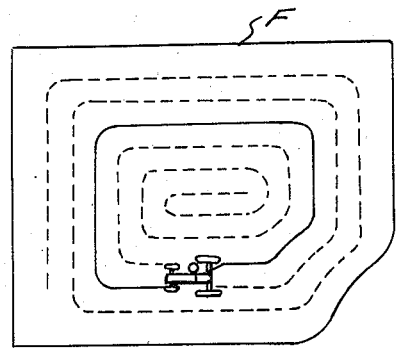
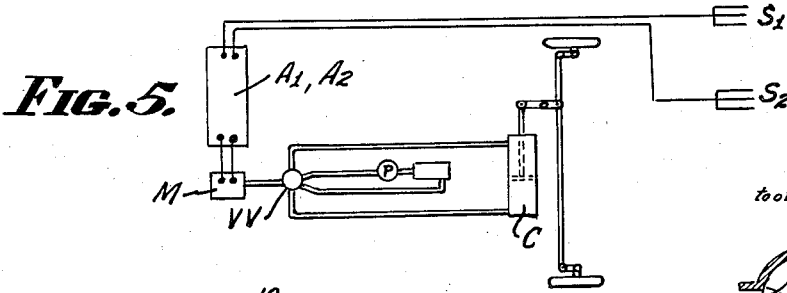
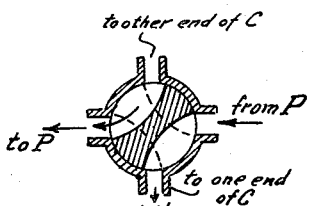
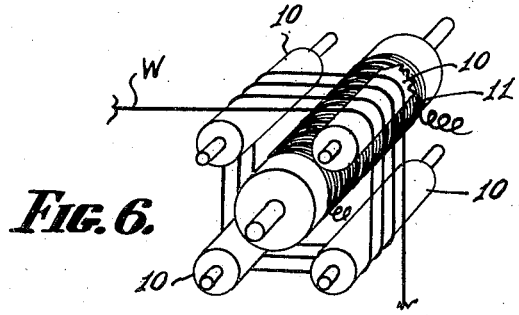
INVENTOR.
KENNETH K. KNIGHT
AND WILLIAM J. WENZEL,
BY
ATTORNEYS.

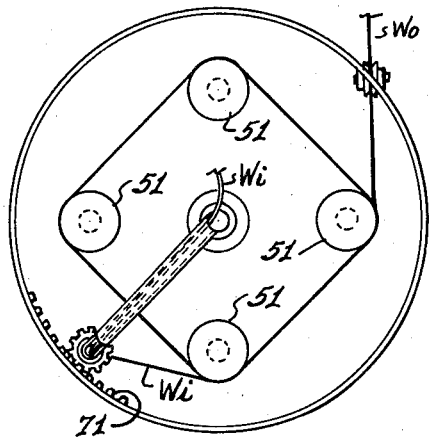
FIG.9.
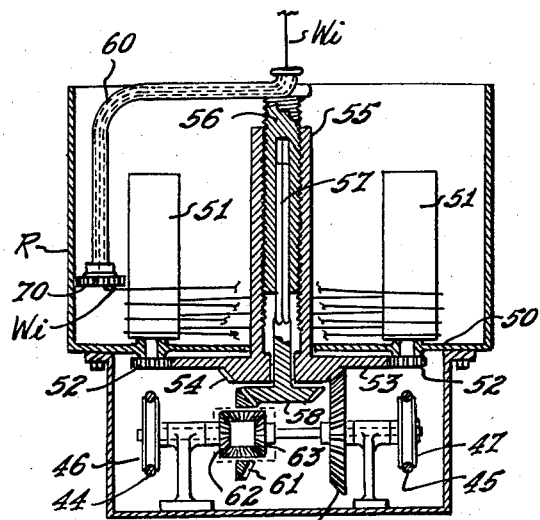
FIG.8.
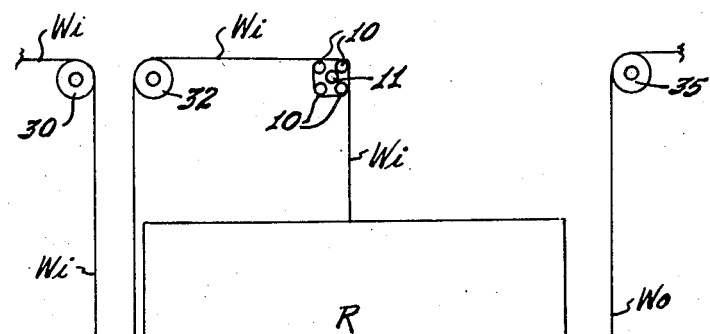
FIG.7.
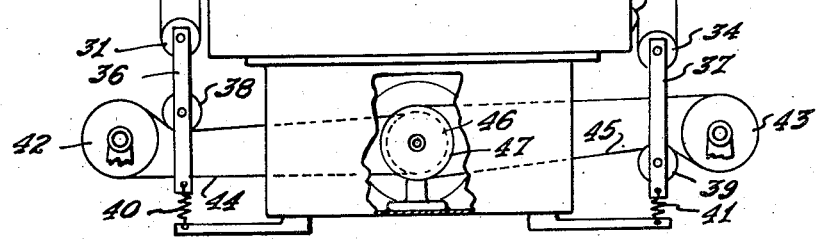
INVENTORS.
KENNETH K. KNIGHT
AND WILLIAM J. WENZEL,
BY
ATTORNEYS.

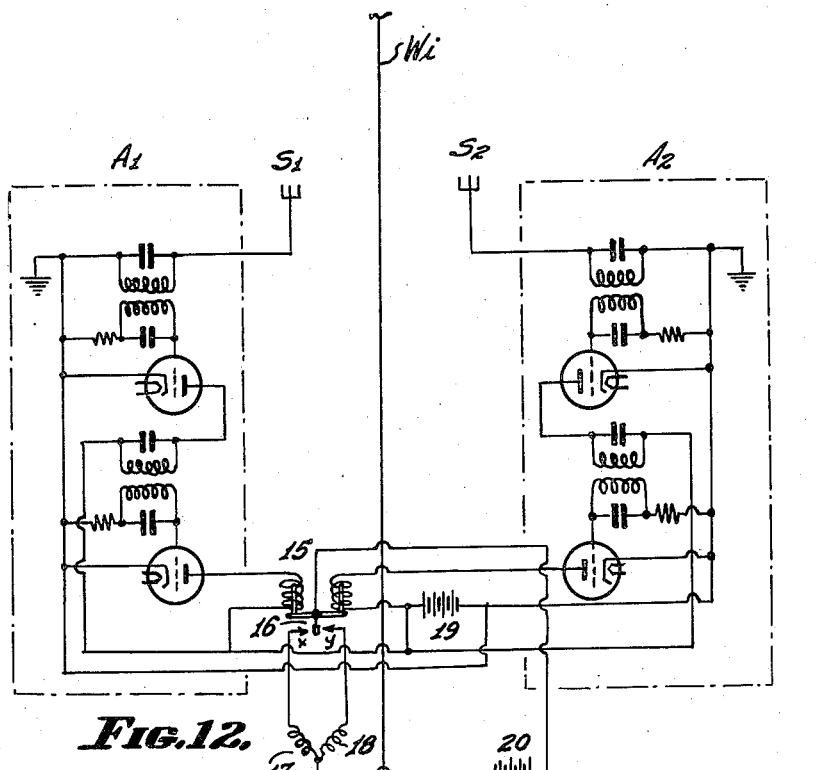
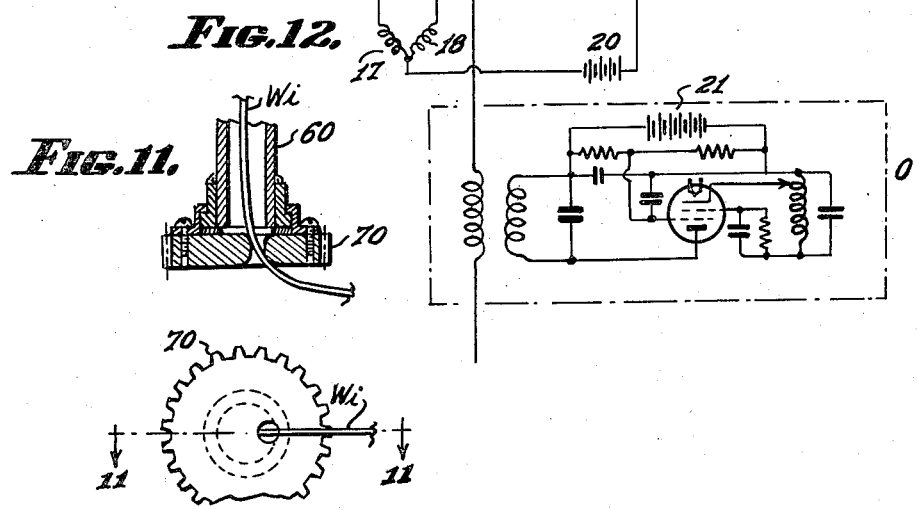
Fig. 12.
Fig. 11.
Fig. 10.
INVENTORS.
KENNETH K. KNIGHT
AND WILLIAM J. WENZEL,
BY
ATTORNEYS.

United States Patent Office 2,824,616
Patented Feb. 25, 1958

2,824,616

AUTOMATIC SELF-STEERING VEHICLE

Kenneth K. Knight and William J. Wenzel,
Great Falls, Mont.

Application January 17, 1955, Serial No. 482,367

9 Claims. (Cl. 180—79)

This invention relates to an automatic self-steering vehicle which may be a farm tractor or the like, which will make a human operator unnecessary in steering the tractor or other vehicle over a course of travel which will completely cover the ground to be worked.

In operation such as plowing large fields by means of a tractor to which a plow is attached, an operator must sit on the tractor and steer the tractor so as to cover the entire ground which is to be treated. During much of this time the operator has nothing to do and there are many other chores which the operator could perform if he were freed from the necessity of guiding the tractor.

While we have mentioned plowing above, it should be understood that this invention is applicable to substantially any operation where an implement of some sort is required to cover an area in a series of spaced courses. Thus, it could apply to the mowing of a lawn or to a harrowing or other earth-working operation as well as plowing.

It is a principal object of our present invention to provide control means for steering a vehicle and to provide means for laying a guide track in a first path together with means for following the previously laid guide track on a subsequent path.

It is another object of the invention to provide sensing means for said previously laid track and to provide an operative connection whereby sensings of said sensing means are transmitted to said steering mechanism, whereby the device is caused automatically to follow the previously laid guide track.

It is another object of the present invention to provide an accumulator for a great length of a flexible element, together with means for paying out said flexible element behind the vehicle and means for taking up previously laid lengths of said flexible element in front of the vehicle, the means paying out said flexible element being offset with respect to the means for taking it up in relation to the longitudinal axis of the vehicle.

It is another object of the invention to provide a differential accumulating reel from which a length of flexible element may be payed out and onto which a length of flexible element may be wound, wherein said flexible element may be payed out at a faster or a slower rate than it is being taken up and wherein the rates of paying out and taking up may be constantly changing.

If, for example, the device of the present invention is being used in a rectangular field and the first course follows the perimeter of the field with the device laying down a guide track of the flexible element inwardly displaced and parallel to the first course, it will be understood that on the second course the accumulating device will be called upon to take up a greater length of the flexible element than is being payed out in laying the next succeeding course. Similarly, if the device is being used in the opposite sense, the accumulating device may be called upon to pay out a greater length of flexible element than is being taken in.

It is therefore another object of the invention to provide a differential reel which will automatically and differentially take up and pay out flexible element while storing or accumulating any flexible element being taken in excess of that being paid out.

These and various other objects of the invention which will be described in more detail hereinafter or which will become apparent to one skilled in the art upon reading these specifications, we accomplish by that certain construction and arrangement of parts of which we shall now describe an exemplary embodiment.

Reference is made to the drawings forming a part hereof and in which:

Figure 1 is a diagrammatic side elevational view of a vehicle according to the present invention.

Figure 2 is a diagrammatic plan view of the same.

Figure 3 is a diagrammatic plan view of a field showing the first step in the operation of the vehicle.

Figure 4 is a view similar to Figure 3 showing a subsequent step.

Figure 5 is a diagrammatic representation of a steering mechanism and a sensing mechanism whereby sensings are caused to operate the steering gear.

Figure 5a is a diagrammatic representation of the valve VV.

Figure 6 is a perspective view of a device for magnetizing a flexible element.

Figure 7 is an elevational view of a differential accumulating reel.

Figure 8 is a diametral cross-sectional view of a differential accumulating reel.

Figure 9 is a plan view of the same.

Figure 10 is a bottom view of the winding on element.

Figure 11 is a fragmentary cross-sectional view of the same taken on the line 11—11 of Figure 10, and Figure 12 is a wiring diagram.

Briefly, in the practice of our invention, we provide a power driven wheeled vehicle, which may be a farm tractor or the like, having a hydraulic or other power steering mechanism. On the vehicle is mounted an accumulating differential reel for storing a long length of a flexible element which may, for example, be a wire. Means are provided for taking up wire and feeding it onto said reel and means are provided for paying out said wire behind the vehicle. With respect to the longitudinal axis of the vehicle, the taking in and paying out means are laterally offset and the amount of offset may be made adjustable if desired. Sensing means are provided at the front of the vehicle so that sensings from said sensing means, induced by a magnetized wire or the like, are transmitted to the steering mechanism so that the vehicle is caused to folllow a wire previously laid down.

Referring in more detail to the figures, we have shown a vehicle generally at V and as pointed out above the vehicle may be a conventional farm tractor or the like. Mounted on the vehicle is an accumulating differential reel R, upon which a length of wire indicated at $W_i$ may be taken up and from which a length of wire $W_o$ may be payed out. The wire may be payed out through a guide G, the position of which may be adjusted with respect to the vehicle. Thus, in Figure 2 it will be observed that the wire $W_o$ is laterally offset with respect to the wire $W_i$. A sensing device S is provided at the front of the vehicle and sensings induced therein by the wire $W_i$ are transmitted to a steering mechanism so that the vehicle V will follow the path laid down by the wire $W_i$.

Referring now to Figures 3 and 4, if it is desired to cover a field, indicated generally at F, the operator will start the vehicle V at the point indicated at $V_1$ and will drive the vehicle around the perimeter of the field. It will be clear that the field could have other than a rectangular configuration, as indicated for example at $V_2$. During this first course around the perimeter of the field, the operator causes wire to be payed out from the reel R and the wire will be payed out in a path parallel to the path of the vehicle but displaced inwardly of the path of the vehicle. When the operator has made the entire circuit of the field and has returned to the point $V_1$, he aligns the vehicle so that its sensing device S embraces the previously laid wire W and feeds the end of the wire onto the reel R, connecting the two ends of the wire. He then starts the vehicle in motion and can then proceed about his other chores, while the vehicle will continue to cover the field, taking up the previously laid wire while at the same time laying a new path again inwardly offset, as shown in Figure 4, until the entire field has been covered. At this point, means are provided to stop the vehicle.

Referring to Figure 5, the sensing device comprises the sensing elements $S_1$ and $S_2$ which, in the event that the flexible element is a magnetized wire, are simply detecting units for detecting electromagnetic radiation from the wire in proportion to their proximity to the wire. Any difference in radiation so detected is amplified in an electronic amplifier diagrammatically indicated at $A_1$, $A_2$, causing current to flow and to operate a solenoid or electric motor M which actuates valve VV. Valve VV of suitable design, as illustrated in Figure 5a, directs flow of hydraulic fluid from the pump P to either left or right side of cylinder C, causing steering of the vehicle toward the left or right through a suitable conventional linkage, as shown in Figure 5.

While the flexible element may be in the form of a cord, string, rope, cable, tape, chain, or any continuous flexible material, and while the sensing may be accomplished in various ways, including permanent magnetism, electro-magnetic radiation and radioactivity, which do not constitute a portion of the present invention, we have without limitation shown the use of wire and the energizing of the wire and the detection of electromagnetic radiation. Thus, in Figure 6 we have shown a device for energizing the wire W. This device consists of four spools 10 which are free to revolve in a frame about a core 11 which is excited by an electric oscillator. It will be understood that the device of Figure 6 may be placed anywhere along the wire, although we have shown it to be disposed to energize the wire as it is fed onto the differential accumulating reel. The wire is caused to make a number of turns or wraps around the spools 10, depending upon the strength of energization required. Current is supplied to the core 11 by means of leads as shown in Figure 6.

Referring now to the wiring diagram Figure 12, the sensing units are again shown at $S_1$ and $S_2$. The wire W, which as described above is preferably the incoming wire $W_i$, has been excited as previously described in connection with Figure 6. The twin sensing elements $S_1$ and $S_2$ feed into the amplifier units $A_1$ and $A_2$. These amplifier units will of course be tuned to the particular frequency at which the wire W was excited. The amplifiers $A_1$ and $A_2$ are standard tuned two-stage amplifier units which do not form a part of the invention and which will not be described in detail. It will be understood that any number of stages may be used, as required. The current from each sensing element $S_1$ and $S_2$ is fed to the coils of the relay 15. If the current from the sensing element $S_1$ is greater than that from the sensing element $S_2$, the armature 16 of the relay 15 will be attracted to close the contact X, thereby energizing the coil 17, which represents the windings on an electric motor or on a solenoid, which controls the valve VV described above. When the coil 17 is energized, the hydraulic valve is actuated to direct the flow of hydraulic fluid to the steering mechanism to change the direction of travel of the vehicle and to bring the sensing element $S_2$ closer to the wire W. When the sensing device $S_2$ is closer to the wire W, the current from $S_2$ will be larger than that from $S_1$ so that the contact X will be closed so as to energize the coil 18, which is caused to reverse the flow of hydraulic fluid in the hydraulic system of Figure 5.

When the two sensing elements are equidistant from the wire W, the current through the two coils of the relay 15 will be equal and neither contact X nor Y will be closed and neither of the coils 17 nor 18 will be energized so that the vehicle will continue on a straight course.

The unit indicated at O in Figure 12 is a conventional oscillating unit which generates current at a desired frequency and it is this current which is fed to the core 11, described in connection with Figure 6. 19, 20 and 21 represent sources of electrical energy for the operation of the various units.

Since the details of the amplifying units and oscillating units do not constitute a part of the present invention, they have been described only to the extent necessary to an understanding of the present invention.

Since, as described above, the rates at which wire is being taken up and payed out may vary, with either one being larger than the other, it is necessary to provide an accumulating device upon which the wire may be taken up and from which it may be paid out and upon which an excess may be accumulated. Such a device is shown in Figures 7 to 11 inclusive. Referring first to Figure 7, the accumulating reel is indicated generally at R. The wire which is being taken up passes over a series of pulleys 30, 31 and 32, and thence about the induction device heretofore described in connection with Figure 6, and thence onto the reel. The wire being payed out passes over pulleys 33, 34 and 35. The pulleys 31 and 34 are mounted on arms 36 and 37 upon which are respectively also mounted pulleys 38 and 39. The arms 36 and 37 are under tension of the springs 40 and 41.

At 42 and 43 are shown pulleys which are continuously driven at a constant speed, as for example from a power take-off from the prime mover of the vehicle, and these pulleys by means of belts 44 and 45 drive the pulleys 46 and 47.

In the case of the incoming wire $W_i$, it will be clear that as long as there is no resistance to the taking up of the wire, the spring 40 will urge the roller 38 against the belt 44 so as to maintain driving tension. If there is resistance to taking up of the wire $W_i$, the roller 38 will be pulled away from contact with the belt 44, permitting the belt to slip so that the pulley 46 ceases to be driven.

In the case of the outgoing wire, the situation is reversed, in that the pulley 39 maintains driving tension on the belt 45 only so long as there is pull on the wire $W_o$. When there is no pull, the spring 41 pulls the roller 39 out of contact with the belt 45, permitting it to slip and ceasing to drive the pulley 47.

Turning now to Figure 8, we have shown the two pulleys 46 and 47 which are adapted to be driven by the belts 44 and 45 and it will be understood that the pulley 46 is turning when wire is being taken up, while the pulley 47 turns only when wire is being payed out, and it will be understood that the speed of the pulleys 46 and 47 is proportional to the rate at which the wire is being taken up and payed out, respectively.

On a platform 50 bearings are provided for four rollers 51 which are symmetrically disposed. Each of the rollers 51 is provided with a small gear 52 by means of which it may be rotated. The four gears 52 are adapted to mesh with a large sun gear 53 having a bevelled gear 54 integral therewith and having a central internally threaded sleeve 55. Threaded into the sleeve 55 is an externally threaded element 56 which is connected by means of a spline 57 to a gear 58 coaxial with the gears 53 and 54. Secured to the member 56 is a wire feeding arm 60 which extends radially outward and then downward and which is preferably tubular so that the incoming wire $W_i$ may pass through it. The individual rollers 51 are provided with helical grooves to accept the wire as it is wound around them.

The gear 58 is arranged to be driven by the gear 61 which is secured to the cage of the differential. The differential has an input gear 62 driven by the pulley 46 and an input gear 63 driven by the pulley 47, so that the gear 61 constitutes the output of the differential. The pulley 47 also drives a gear 64 which meshes with the gear 54 described above.

In describing the operation of this device, let it be assumed first that no wire is being payed out but that wire is being taken up. From what has gone before, it will be understood that under these conditions the pulley 46 will be rotating and the pulley 47 will be stationary. The pulley 46 drives the gear 62 and since the pulley 47 is not rotating, the gear 63 is not rotating. By the action of the differential, the entire input of the gear 62 is transmitted to the cage and the cage gear 61, and from the gear 61 the drive is transmitted to the gear 58 which through the splined connection 57 causes the member 56 to rotate. As it rotates by virtue of its threaded connection with the member 55 which under these conditions is stationary, the member 56 is moving upwardly. As the member 56 rotates and moves upwardly, the gear 70, which will be described hereinafter, at the end of the arm 60 is caused to orbit around the four rollers 51 and move upwardly at the same time to describe a helical path. Thus, the wire $W_1$ entering the arm 60 is by this action wound helically around the four rollers 51. At this point it may be well to mention that because of the rotation of the arm 60, a twist is imparted to the wire $W_1$. The function of the gear 70 is to remove the twist. The gear 70 has a bearing on the end of the arm 60, as best seen in Figure 11, and it meshes with the partial internal gear 71 fixed to the inside of the casing of the reel R. As the arm 60 rotates, the gear 70, engaging the stationary gear 71 once in every revolution of the arm 60, rotates in a reverse direction so as to take out of the wire the twist which was put into it by the rotating of the arm 60.

Now let us assume that no wire is being taken up on the reel but that wire is being payed out. Under this hypothesis, the pulley 46 and the gear 62 are stationary while the pulley 47 is rotating and, therefore, the gear 64 and the gear 63 are rotating. Rotation of the gear 64 is transmitted through the gear 54 to the gear 53 and thence to the four small gears 52 so that each of the rollers 51 is caused to rotate about its own axis to feed the wire $W_0$ off from the bottom.

It will be understood that because the wire lies in helical grooves on the rollers 51, the locus at which the wire $W_0$ came off would be continuously rising. This, however, is avoided because of the fact that the gear 63 is rotating and the entire input of the gear 63 is transmitted to the cage gear 61 which drives the gear 58 in the opposite direction. The opposite rotation of the gear 58 is transmitted through the splined connection 57 to the member 56 which is caused to rotate in the opposite direction so that the wire is being continuously unwrapped at the top from the rollers 51 as it is being fed off the bottom. Thus, the wire is always fed off the bottom and if no wire is being taken up, the rotating arm 60 simply lowers the level of the stored wire at the top.

If wire is being reeled in and payed out at equal rates, it will be clear that the gears 62 and 63 will be caused to rotate in opposite directions so that the cage gear 61 and the gear 58 and the member 56 will not rotate and the level of stored wire will remain stationary. It will be clear from what has gone before that the reel of Figures 7 to 11 will always store or accumulate the difference between the amount of wire being taken in and the amount being payed out.

The operation of winding the wire onto the rollers 51 by rotation of the arm 60 induces a twist into the wire and this twist is taken out of the wire by means of the gear 70, as best seen in Figures 10 and 11 and as described above.

It will be clear that numerous modifications may be made in details of our invention and that the specific embodiment described is to be considered as being by way of example only. We do not intend to limit ourselves in any manner other than as set forth in the claims which follow.

Having now fully described our invention, what we claim as new and desire to secure by Letters Patent is:

1. In combination with a self-propelled machine, a continuous flexible element of great length, storing means for said flexible element mounted on said machine, means forming a part of said storing means for paying out said flexible element from said storing means, and laying it down behind said machine, means forming a part of said storing means for taking up said flexible element in front of said machine, said taking up and paying out means being offset with respect to each other from the longitudinal axis of said machine, a steering mechanism for said machine mounted thereon, sensing means mounted on the front of said machine and arranged to sense the position of said flexible element before it is taken up, and means mounted on said machine and operative in response to sensings of said sensing means to actuate said steering mechanism.

2. A machine according to claim 1, including means forming part of said storing means for accumulating any length of said flexible element taken up in excess of the length of said flexible element payed out.

3. A machine according to claim 2, wherein said accumulating means comprises a differential driven storage reel having an element driven in proportion to the rate at which said flexible element is being taken up, and an element driven in proportion to the rate at which said flexible element is being laid down.

4. In combination with a self-propelled machine having a power actuated steering mechanism, a flexible guide element defining a desired path to be followed by said machine, sensing means on said machine to sense the position of said guide element, and mechanism on said machine for actuating said steering mechanism in accordance with sensings of said sensing means, to cause said machine to follow said guide element, and means on said machine for picking up said flexible element and relaying it in a new position as the machine proceeds, thus defining a succeeding path for said machine.

5. The combination of claim 4, wherein said guide element is metallic, and including means on said machine for energizing said element from said machine while said element is in motion, so that its position can be sensed by said sensing means.

6. The combination of claim 5, wherein said sensing means comprise a spaced pair of antennae, electronic means for amplifying the currents generated in said antennae by said element, and means for causing said amplified currents to actuate said steering mechanism.

7. The combination of claim 6, wherein said steering mechanism is hydraulically actuated under the control of a valve, electromagnetic means for operating said valve, and means for supplying said amplifying currents to said electromagnetic means.

8. The method of covering a ground area with a self-propelled machine, having a steering mechanism, in a number of passes which are parallel and continuous, which includes the steps of making a first pass over said ground area while laying down behind said machine a guide element displaced laterally from the path of said machine, causing said machine to proceed while sensing the position of said previously laid down guide element and causing said sensings to actuate said steering mechanism, picking up the previously laid down guide element and laying down additional guide element in displaced relation to the previously laid down guide element.

9. The method of claim 8, which includes the step of accumulating in said machine any surplus guide element picked up in exceed of guide element laid down.

References Cited in the file of this patent

UNITED STATES PATENTS

| | | |
|---|---|---|
| 2,090,707 | Sloane | Aug. 24, 1937 |
| 2,317,400 | Paulus et al. | Apr. 27, 1943 |
| 2,339,291 | Paulus et al. | Jan. 18, 1944 |
| 2,395,302 | Slomer | Feb. 19, 1946 |
| 2,513,868 | Hill | July 4, 1950 |
| 2,690,626 | Gay et al. | Oct. 5, 1954 |
| 2,742,099 | Hagen | Apr. 17, 1956 |
| 2,750,583 | McCullough | June 12, 1956 |